United States Patent

[11] 3,570,371

| [72] | Inventor | David P. Herd<br>Houston, Tex. |
|---|---|---|
| [21] | Appl. No. | 774,038 |
| [22] | Filed | Nov. 7, 1968 |
| [45] | Patented | Mar. 16, 1971 |
| [73] | Assignee | Rockwell Manufacturing Company<br>Houston, Tex. |

[54] HYDRAULIC ACTUATOR
18 Claims, 2 Drawing Figs.

[52] U.S. Cl............................................................ 91/412,
60/52, 60/97, 137/554
[51] Int. Cl................................................................ F15b 11/16
[50] Field of Search............................................. 60/52
(CD), 52 (US), 97 (SE); 91/412; 137/554

[56] References Cited
UNITED STATES PATENTS

| 2,716,418 | 8/1955 | Borgerd........................ | 137/554X |
| 3,151,624 | 10/1964 | Koutnik........................ | 137/554X |
| 3,205,909 | 9/1965 | Oldfield........................ | 137/554X |
| 1,994,974 | 3/1935 | Wiedmann.................... | 91/412X |
| 2,058,377 | 10/1936 | Francis........................ | 91/412X |
| 2,616,259 | 11/1952 | Quintilian..................... | 91/412X |
| 3,186,309 | 6/1965 | Killebrew..................... | 91/412 |

Primary Examiner—Edgar W. Geoghegan
Attorneys—Murray Robinson and Ned L. Conley

ABSTRACT: A hydraulic actuator and related system for activating a control device or the like. The actuator comprises a case with a chamber therein and a shaft longitudinally disposed in the chamber for limited longitudinal movement. An inlet port provides communication between the chamber and a pressure source. A valve seat is provided around the port and a valve member attached to one end of the shaft is biased toward seating contact with the seat. The opposite end of the shaft projects outwardly of the chamber through annular sealing means to contact a control device for activation thereof. The cross-sectional area of the shaft at the annular sealing means is greater than the pressure area of the valve member subjected to the pressure in the port when the valve member is seated. A relief port through the case and conduit means are provided to connect the chamber to a low-pressure atmosphere when the valve member is seated and to a higher pressure atmosphere when the valve member is unseated to substantially prevent fluid pressure loss from the chamber. A restrictive orifice is provided in the conduit to substantially reduce pressure loss from the chamber on initial unseating of the valve member.

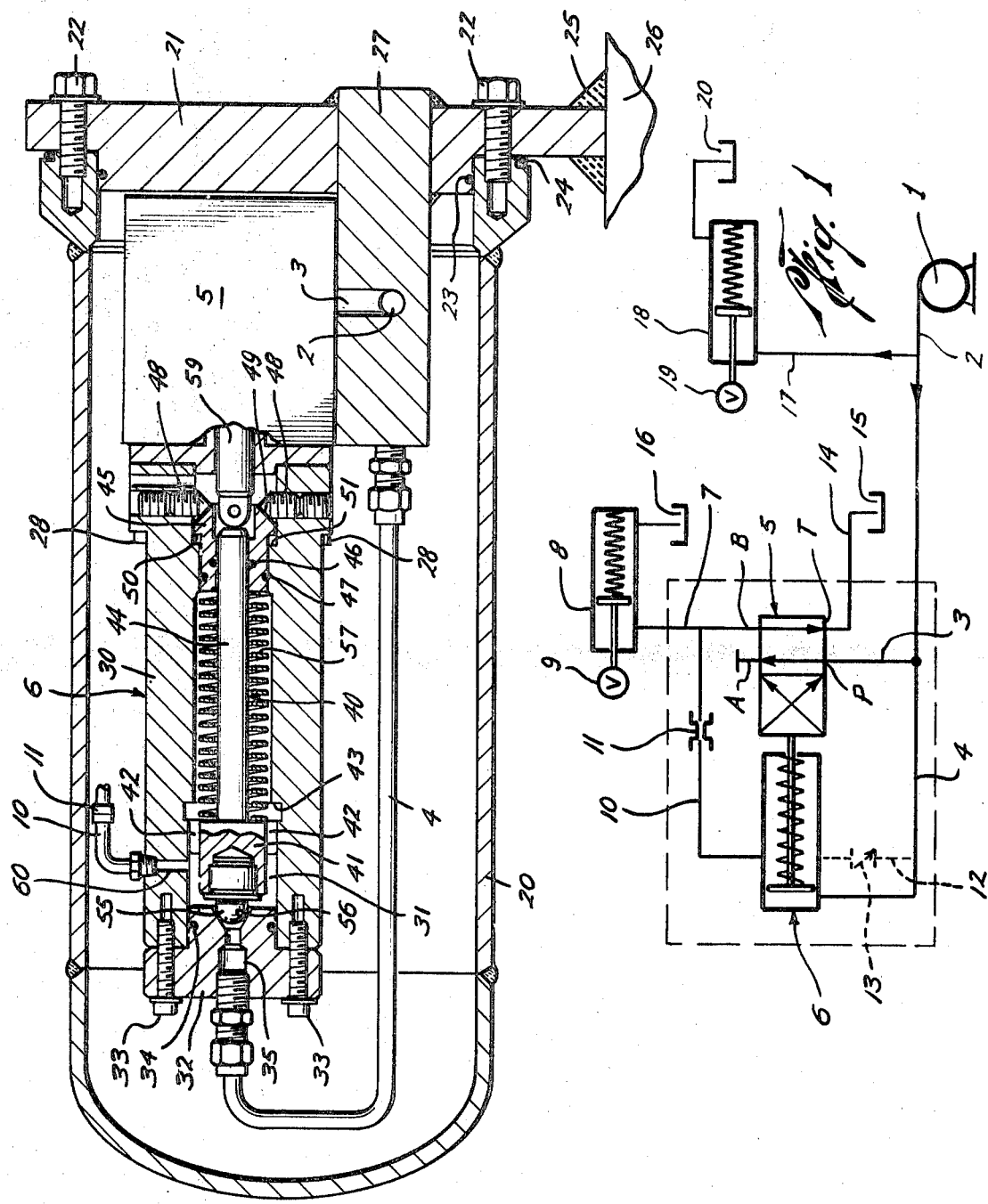

HYDRAULIC ACTUATOR

BACKGROUND OF THE INVENTION

1. Field of the Invention

This invention is related to control devices. More specifically it concerns a hydraulic actuator for activating a device such as a control valve which selectively directs fluid flow to other devices such as a hydraulically operated valve.

2. Description of Prior Art

Frequently two or more hydraulically operated devices such as valves are installed in a service related to each other. It may be necessary, in certain situations, to operate these devices in a particular sequence. In some installations, e.g., underwater wells, it is desirable to limit the number of control lines to valves and other devices. Therefore, a system utilizing one pressure line to sequentially operate two or more devices is normally preferable in such an installation.

In the past, one way of operating two or more valves has been to use springs of different spring constants in each of the operators of hydraulically operated valves. However, such a system is sometimes not sensitive enough to pressure differentials and might require a different operator design to assure correct sequential operation. This is due to the fact that the line pressure of a valve usually has a greater effect on its opening and closing pressures than the operator spring does.

SUMMARY OF THE INVENTION

The present invention concerns a hydraulic actuator for activating a control device or the like, comprising case means having a pressure chamber therein, shaft means longitudinally disposed in the chamber, port means passing through the case means into one end of the chamber, a valve seat surrounding the port, valve means at one end of the shaft means and means biasing the valve means toward seating contact with the valve seat whereby a pressure area of the valve means is exposed to pressure from the port means to unseat the valve means at a predetermined pressure, characterized in that the end of the shaft means opposite the valve means projects outwardly of the chamber through annular sealing means to contact the control device for activation thereof on longitudinal movement of the shaft means. A relief port is provided for connecting the chamber through a conduit with a low-pressure atmosphere when the valve is seated. When the valve is unseated this port is connected through conduit means with a pressure atmosphere equal to the pressure at the inlet port preventing fluid flow and pressure loss in the chamber. The cross-sectional area exposed to the pressure in the inlet port is greater after unseating of the valve so that a substantial and instantaneous increase in force is applied to the shaft and the control device for quick activation thereof.

BRIEF DESCRIPTION OF THE DRAWINGS

Other objects and advantages of the invention will become apparent from the following description when taken in conjunction with the drawings in which:

FIG. 1 is a schematic hydraulic circuit representing a preferred embodiment of the invention for operating valves or the like; and FIG. 2 is an elevational view, partially in section of an actuator and control valve according to a preferred embodiment of the invention for use with a hydraulic circuit such as shown in the schematic drawing of FIG. 1.

DESCRIPTION OF THE PREFERRED EMBODIMENT

Referring to the schematic drawing in FIG. 1 a remote pressure source 1 is connected by conduits 2, 17 to a valve operator 18 which operates valve 19 and by conduits 2, 3 and 4 to a four-way control valve 5 and control actuator 6. Control valve 5 is connected through a port B and conduit 7 to a valve operator 8 which operates valve 9. Another conduit 10, in which is installed a restrictive orifice 11, connects an inner chamber of actuator 6 with conduit 7 for reasons to be subsequently explained. In a variation of the embodiment shown, conduit 12 and check valve 13 connecting the inner chamber to pressure supply conduit 4 could be substituted for conduit 10 and orifice 11.

In the particular circuit shown port A of a standard four-way valve, such as Vickers DG2S4-012A-41, would be blocked off. Port T would be connected by conduit 14 to a dump tank 15. Valve operators 8 and 18 would also be connected to dump tanks 16 and 20 respectively.

In operation, hydraulic pressure would first be supplied from source 1 to valve operator 18 and actuator 6. At a predetermined pressure, operator 18 would open valve 19. At a higher predetermined pressure level, actuator 6 would quickly actuate control valve 5 connecting port P with port B and supplying sufficient pressure to operator 8 to cause valve 9 to be opened. To close valve 9 supply pressure would be reduced to a point such that actuator 6 would be returned to its original position by a biasing element, more fully described hereafter. This would cause control valve ports B and T to be connected, venting the pressure in operator 8 to tank 15 and allowing operator 8 to return to its original position. A further reduction in pressure would allow operator 18 and valve 19 to return to their original positions.

Referring also now to FIG. 2, a more complete description of actuator 6 will be given. The actuator 6 and control valve 5 are shown enclosed in a protective housing 20 and base plate 21 connected by bolts 22. Seals 23 and 24 are provided to seal the interior of housing 20 against external environments such as water in underwater wellhead installations. Plate 21 may be welded as at 25 to a support member 26. A conduit block 27 may be welded to plate 21 providing connecting portions of conduits 2, 3, 4, 7 and 14 (see FIG. 1).

Actuator 6 is shown connected to the top of control valve 5 by cap screws 28. Actuator 6 comprises a case member 30 having a pressure chamber 31. Chamber 31 is closed at the upper end by cap member 32, cap screws 33 and annular seal 34. A port 35 is provided through cap 32 for connecting conduit 4 to chamber 31.

Longitudinally disposed in chamber 31 is plunger shaft 40. The lower end of chamber 31 is closed by annular sleeve member 45 through which passes the shank or lower end 44 of shaft 40. O-ring 46 provides a sliding seal between sleeve 45 and shaft 40. O-ring 47 seals between sleeve 45 and the walls of chamber 31. Sleeve 45 is mounted for limited longitudinal displacement on lateral set screws 48. This displacement is accomplished through the cooperation of conical points on the ends of set screws 48 and the frustoconical lower surface 49 of sleeve 45. Upwardly facing annular sleeve shoulder 50 and downwardly facing annular chamber shoulder 51 limit the upward movement of sleeve 45.

The upper end of shaft 40 is provided with a valve member 55, preferably of the ball type which is biased against a frustoconical seat 56 around port 35. The cross-sectional area of ball 55 at its point of contact with seat 56 is less than the cross-sectional area of shaft shank 44. Biasing is accomplished by a helical spring member 57 mounted around shaft 40 between sleeve 45 and a head portion 41 of shaft 40. Ribs 42 project radially at intervals around head 41. These ribs allow fluid passage around head 41 and limit downward displacement of shaft 40 by contacting an upwardly facing annular shoulder 43 around the wall of chamber 31. The lower end 44 of shaft 40 is in contact with upwardly biased stem 59 of control valve 5.

A port 60 provides a connection for conduit 10 in which is installed orifice 11. Conduit 10 may be run inside or outside of housing 20 to connect with conduit 7 as shown in FIG. 1.

To fully describe the operation of actuator 6 and the entire system, a hypothetical example will be given referring to both FIGS. 1 and 2. Suppose it is desired to open valve 19 at a pressure of 1,800 p.s.i. or less and valve 9 at 2,000 p.s.i. This can be done with the proper design and selection of actuator spring 57.

First, a pressure is built up to 1,800 p.s.i. from pressure source 1. Valve operator 18 with the properly selective spring causes valve 19 to open. Then the pressure is increased to 2,000 p.s.i. Spring 57 of actuator 6 is selected to allow unseating of ball 55 at 2,000 p.s.i. The initial pressure in chamber 31 is the same as the pressure in tank 15 since it is connected thereto through conduit 10, 8 and 14. Once the ball 55 is unseated the force to the right (FIG. 2) on shaft 40 is suddenly increased due to the increased cross-sectional area of shank 44. This causes shaft 40 and stem 59 to snap to the right, quickly actuating control valve 5 and supplying operator 8 with operating pressure through conduits 3 and 7. During the short interval of time between unseating of ball 55 and the complete rightward movement of shaft 40, the loss of pressure through conduit 10 is prevented by restrictive orifice 11. Of course, after actuating valve 5 conduits 7 and 11 are at the same pressure as chamber 31.

To return operator 8 and valve 9 back to their original positions, source pressure 1 is reduced. The larger cross-sectional area of shank 44 prevents seating of ball 55 until the pressure is decreased to a substantially lower value, say 1,500 p.s.i. in this hypothetical case. When ball 55 reseats and shaft 40 moves to the left, control valve 5 returns to its initial position, venting conduit 7 and operator 8 to tank 15. Thus, operator 8 returns valve 9 to its initial position. The pressurized fluid in chamber 31 is also vented to tank 15 through conduit 10 and 7. Further, reduction of pressure to a value less than 1,500 p.s.i., e.g. 1,000 p.s.i. will allow valve operator 18 to close valve 19. Thus, all components are returned to their original pressure conditions allowing repeated performance of the system at the same pressures.

If chamber 31 were not vented through conduit 11 it would retain the pressure for reseating ball 55, in this case 1,500 p.s.i. Thus, on repeating the procedure, ball 55 would be unseated at this lower pressure, 1,500 p.s.i., disregarding friction forces. It is conceivable that a situation similar to this might be desirable. Therefore, as an alternative embodiment, conduit 10 and orifice 11 could be replaced with conduit 12 and check valve 13 (dotted lines in FIG. 1) connecting chamber 31 to conduit 4. With this construction a number of unseating pressures could be established. For example, the pressure in conduit 4 could be reduced to 500 p.s.i. allowing chamber 31 to bleed down, through check valve 13, to 500 p.s.i. also. Then, disregarding friction, an 1,830 p.s.i. pressure would unseat ball 55. By returning pressure in conduit 4 to 0 p.s.i. the initial unseating pressure of 2,000 p.s.i. could be reestablished. Other modifications for chamber relief could also be devised.

Thus, a hydraulic system utilizing a single control line, for quick response and sequential operation of two or more hydraulically controlled devices such as fluid-operated valves has been described herein. Such a system is designed to eliminate extra control lines, erratic operation of these hydraulic devices and to reduce wear and flow problems associated with slow operation of these devices.

Two preferred embodiments of the invention are shown in the drawing and described in the specification, but many variations thereof will be apparent to those skilled in the art. It is not practical to show or describe all the variations included within the invention, and therefore the embodiments described should be considered illustrative only, and not limiting, the scope of the invention being as broad as is defined by the appended claims. The form of the claims and the specification, including the abstract, is adopted solely for easier reading and understanding, and should not be considered in interpreting the scope of the invention claimed.

I claim:

1. A hydraulic actuator for activating a control device or the like, comprising case means having a pressure chamber therein, shaft means longitudinally disposed in said chamber, port means passing through said case means into one end of said chamber, a valve seat surrounding said port, valve means at one end of said shaft means, and means biasing said valve means toward seating contact with said valve seat whereby a pressure area of said valve means is exposed to pressure from said port means to unseat said valve means at a predetermined pressure, characterized in that the end of said shaft means opposite said valve means projects outwardly of said chamber through annular sealing means to contact said control device for activation thereof on longitudinal movement of said shaft means, the cross-sectional area of said shaft means at said annular sealing means being greater than said exposed valve pressure area.

2. A hydraulic actuator as set forth in claim 1 characterized in that a single pressure control line is connected to said actuator and one or more hydraulic operable devices, said actuator being connected to another hydraulically operable device so that said one or more hydraulically operable devices and said another hydraulically operable device may be operated in a predetermined pressure sequence.

3. A hydraulic actuator as set forth in claim 1, characterized by a relief port connecting said chamber through conduit means to a pressure atmosphere less than said predetermined pressure when said valve means is seated.

4. A hydraulic actuator as set forth in claim 3, characterized by switching means for connecting said relief port through said conduit means to a pressure atmosphere as great as said predetermined pressure when said valve means is unseated to substantially prevent fluid flow through said chamber.

5. A hydraulic actuator as set forth in claim 4, characterized in that said conduit means comprises flow restriction means to substantially reduce the flow through said conduit means on initial unseating of said valve means.

6. A hydraulic actuator as set forth in claim 1, characterized in that said annular sealing means comprises annular sleeve means having an internal annular seal in sliding contact with said shaft means and an external annular seal in contact with said case means near one end of said chamber.

7. A hydraulic actuator as set forth in claim 6, characterized in that said biasing means comprises a spring mounted around said shaft, one end of which bears against said sleeve means, the other end of which bears against said valve means, said sleeve means being adapted for limited longitudinal adjustment relative to said chamber.

8. A hydraulic system for operation of at least one fluid-operated device, comprising a fluid pressure source connected through conduit means to control means and actuator means, said control means being connected through other conduit means to said fluid-operated device and said actuator means being cooperatively associated with said control means to selectively activate said control means for directing pressurized fluid to said fluid-operated device, characterized in that said actuator means comprises a force-transmitting element mounted in a pressure chamber and connected to said control means for said activation thereof, said force-transmitting element being adapted to instantaneously and substantially increase said activating force on said fluid source supplying a predetermined fluid pressure to said actuator through port means in said chamber, venting means independent of said port means connecting said chamber means to fluid disposal means for reducing the pressure within said chamber means when said pressure source is below said predetermined pressure.

9. A hydraulic system as set forth in claim 8, characterized in that said actuator is adapted to subject a first area of said force-transmitting means to said fluid pressure source when below said predetermined pressure and to subject a second larger area of said force-transmitting means to said fluid pressure source when above said predetermined pressure.

10. A hydraulic system as set forth in claim 9, characterized in that a valve seat is provided around said port means and said force-transmitting means is provided with a valve member and biasing means sealingly biasing said valve member against said valve seat when said fluid pressure source is below said predetermined pressure to isolate said chamber means from said pressure source.

11. A hydraulic system as set forth in claim 10, characterized in that said biasing means is adapted to be overcome on said fluid pressure source reaching said predetermined pressure to move said valve member away from said valve seat to allow said second area of said force-transmitting means to be subjected to said fluid pressure source when above said predetermined pressure.

12. A hydraulic system as set forth in claim 8, characterized in that said venting means is adapted to prevent substantial reduction of pressure within said chamber means when said pressure source is above said predetermined pressure.

13. A hydraulic actuator for activating a control device or the like, comprising case means having a pressure chamber therein, an inlet port for connecting a pressure source to said chamber, a valve seat around said port, shaft means mounted within said chamber for limited longitudinal movement therein, valve means at one end of said shaft means, means biasing said shaft means and said valve means toward sealing engagement with said valve seat, sealing means being provided around said shaft means pressure sealing the end opposite said valve means from said pressure chamber, said opposite shaft end contacting said control device for activation thereof on said limited movement of said shaft means, characterized by an outlet port through said case means connecting said chamber means with conduit means, said conduit means being connected, on said valve means disengagement, to a pressure atmosphere substantially the same as said pressure source substantially preventing any fluid flow through said chamber means.

14. A hydraulic actuator as set forth in claim 13, characterized in that the cross-sectional area of said valve means bounded by said port means presents a first pressure area subjected to said pressure source when said pressure source is below a predetermined pressure, said biasing means being overcome by said pressure source when above said predetermined pressure to allow said valve means to disengage said valve seat, said shaft means having a larger second pressure area subjected to said pressure source when said valve means is disengaged from said valve seat.

15. A hydraulic actuator as set forth in claim 13, characterized in that during engagement of said valve means said conduit means is connected to a fluid reservoir at a pressure below said predetermined pressure for maintaining said chamber at a pressure substantially below said predetermined pressure until said valve means disengagement.

16. A hydraulic actuator as set forth in claim 13, characterized in that said conduit means comprises a restrictive orifice to substantially prevent fluid flow through said chamber means on initial disengagement of said valve means.

17. A hydraulic actuator as set forth in claim 13, characterized in that said conduit means comprises a check valve preventing flow into said chamber through said conduit means but permitting flow out of said chamber during said engagement of said valve means.

18. A hydraulic actuator as set forth in claim 13, characterized in that said sealing means comprises an annular member closing one end of said chamber having sealing means on its exterior in contact with said case means and annular sealing means on its interior in sliding contact with said shaft means.